(12) United States Patent
Gentilello et al.

(10) Patent No.: US 12,026,206 B2
(45) Date of Patent: Jul. 2, 2024

(54) DYNAMICALLY CREATING CUSTOM HYPERLINKS FOR PREDEFINED SEARCH QUERIES FOR MULTIPLE WEBSITES

(71) Applicant: Optery, Inc., Clayton, CA (US)

(72) Inventors: Lawrence Robert Gentilello, Clayton, CA (US); Chen Atlas, New York, NY (US)

(73) Assignee: Optery, Inc., Clayton, CA (US)

( * ) Notice: Subject to any disclaimer, the term of this patent is extended or adjusted under 35 U.S.C. 154(b) by 0 days.

(21) Appl. No.: 17/486,847

(22) Filed: Sep. 27, 2021

(65) Prior Publication Data

US 2022/0284065 A1    Sep. 8, 2022

Related U.S. Application Data

(63) Continuation of application No. 17/194,181, filed on Mar. 5, 2021, now Pat. No. 11,132,415.

(51) Int. Cl.
| | |
|---|---|
| *G06F 16/00* | (2019.01) |
| *G06F 16/2457* | (2019.01) |
| *G06F 16/9535* | (2019.01) |
| *G06F 16/9538* | (2019.01) |
| *G06F 16/955* | (2019.01) |
| *G06F 16/958* | (2019.01) |

(52) U.S. Cl.
CPC .... *G06F 16/9535* (2019.01); *G06F 16/24578* (2019.01); *G06F 16/9538* (2019.01); *G06F 16/9558* (2019.01); *G06F 16/9566* (2019.01); *G06F 16/958* (2019.01)

(58) Field of Classification Search
None
See application file for complete search history.

(56) References Cited

U.S. PATENT DOCUMENTS

| | | | | |
|---|---|---|---|---|
| 6,931,591 | B1* | 8/2005 | Brown | G06F 40/166 |
| | | | | 715/205 |
| 8,185,558 | B1* | 5/2012 | Narayanan | G06F 3/04842 |
| | | | | 707/798 |
| 8,250,065 | B1* | 8/2012 | Chambers | G06F 16/954 |
| | | | | 707/723 |
| 8,706,762 | B1* | 4/2014 | Patzer | G06F 16/9535 |
| | | | | 707/790 |

(Continued)

*Primary Examiner* — Hasanul Mobin
(74) *Attorney, Agent, or Firm* — Cognition IP, P.C.; Edward Steakley

(57) ABSTRACT

Methods, systems, and apparatus, including computer programs encoded on computer storage media for creating custom system generated hyperlinks for predefined search queries at an external website. The system stores, in a data storage device, a set of custom URL templates, the custom URL templates defining required data fields to concatenate as parameters for a website link. The system obtains user information about a user where the information includes at least a first name and last name of the user. The system retrieves from the data storage device the set of custom URL templates. The system generates multiple website links based on the retrieved custom URL templates, where the generated website link includes a domain name of a website, and concatenated fields that are parameter specific to the website. The system then displays, via a user interface, a representation of the generated website links for selection by a user.

24 Claims, 13 Drawing Sheets

System Diagram

(56) References Cited

U.S. PATENT DOCUMENTS

| | | | |
|---|---|---|---|
| 10,305,758 B1 | 5/2019 | Bhide et al. | |
| 2010/0010993 A1* | 1/2010 | Hussey, Jr. | G06F 16/9535 |
| | | | 707/E17.014 |
| 2011/0015995 A1* | 1/2011 | Ellingboe | G06Q 30/02 |
| | | | 709/204 |
| 2013/0124538 A1* | 5/2013 | Lee | G06F 16/24575 |
| | | | 707/751 |
| 2013/0191372 A1* | 7/2013 | Lee | G06F 16/9024 |
| | | | 707/769 |
| 2013/0191416 A1* | 7/2013 | Lee | G06F 16/2457 |
| | | | 707/771 |
| 2014/0025702 A1* | 1/2014 | Curtiss | G06Q 30/02 |
| | | | 707/769 |
| 2015/0206177 A1* | 7/2015 | Yao | G06Q 30/0246 |
| | | | 705/14.45 |
| 2017/0046127 A1* | 2/2017 | Fletcher | G06F 3/0484 |
| 2018/0024901 A1* | 1/2018 | Tankersley | G06Q 10/06393 |
| | | | 707/694 |
| 2018/0288070 A1* | 10/2018 | Price | G06F 8/31 |
| 2019/0036960 A1* | 1/2019 | Cullison | H04L 63/1433 |
| 2019/0095443 A1* | 3/2019 | Chan | G06Q 30/06 |
| 2021/0028998 A1* | 1/2021 | Khetarpal | H04L 41/5096 |
| 2021/0117478 A1* | 4/2021 | Hopkins | G06F 16/3338 |

\* cited by examiner

DYNAMICALLY CREATING CUSTOM HYPERLINKS FOR PREDEFINED SEARCH QUERIES FOR MULTIPLE WEBSITES

CROSS REFERENCE TO RELATED APPLICATIONS

This application is a continuation of U.S. patent application Ser. No. 17/194,181, filed on Mar. 5, 2021, the entirety of which is incorporated by reference.

BACKGROUND

Many websites collect and display personal information about individuals. Each of these people search websites require different fields to access data stored by the website. For example, some of the websites may only require a first and last name, others may require a first and last name and age, and others may require a first and last name, and a current city and state of residence to access the information stored by the website. Due to the significant number of the people search websites, a need exists to easily access each website in an efficient manner.

SUMMARY

Described herein is an innovative system and methods directed toward creating dynamic hyperlinks for passing parameters to a website. In one embodiment, methods, systems, and apparatus, include computer programs encoded on computer storage media provide for creating custom system generated hyperlinks for predefined search queries. The system stores, in a data storage device, a set of custom URL templates, the custom URL template defining required data fields to concatenate as parameters for a website link. The system obtains user information about a user where the information includes at least a first name and last name of the user. The system retrieves from the data storage device the set of custom URL templates. The system generates multiple website links based on the retrieved custom URL templates, where the generated website link includes a domain name of a website, and concatenated fields that are parameter specific to the website. The system then displays, via a user interface, a representation of the generated website links for selection by a user.

BRIEF DESCRIPTION OF THE DRAWINGS

The present disclosure will become better understood from the detailed description and the drawings, wherein:

FIG. 9 illustrates an example user interface according to one embodiment of the present disclosure.

FIG. 10 illustrates an example user interface according to one embodiment of the present disclosure.

FIG. 11 illustrates an example user interface according to one embodiment of the present disclosure.

DETAILED DESCRIPTION

Figure 1:
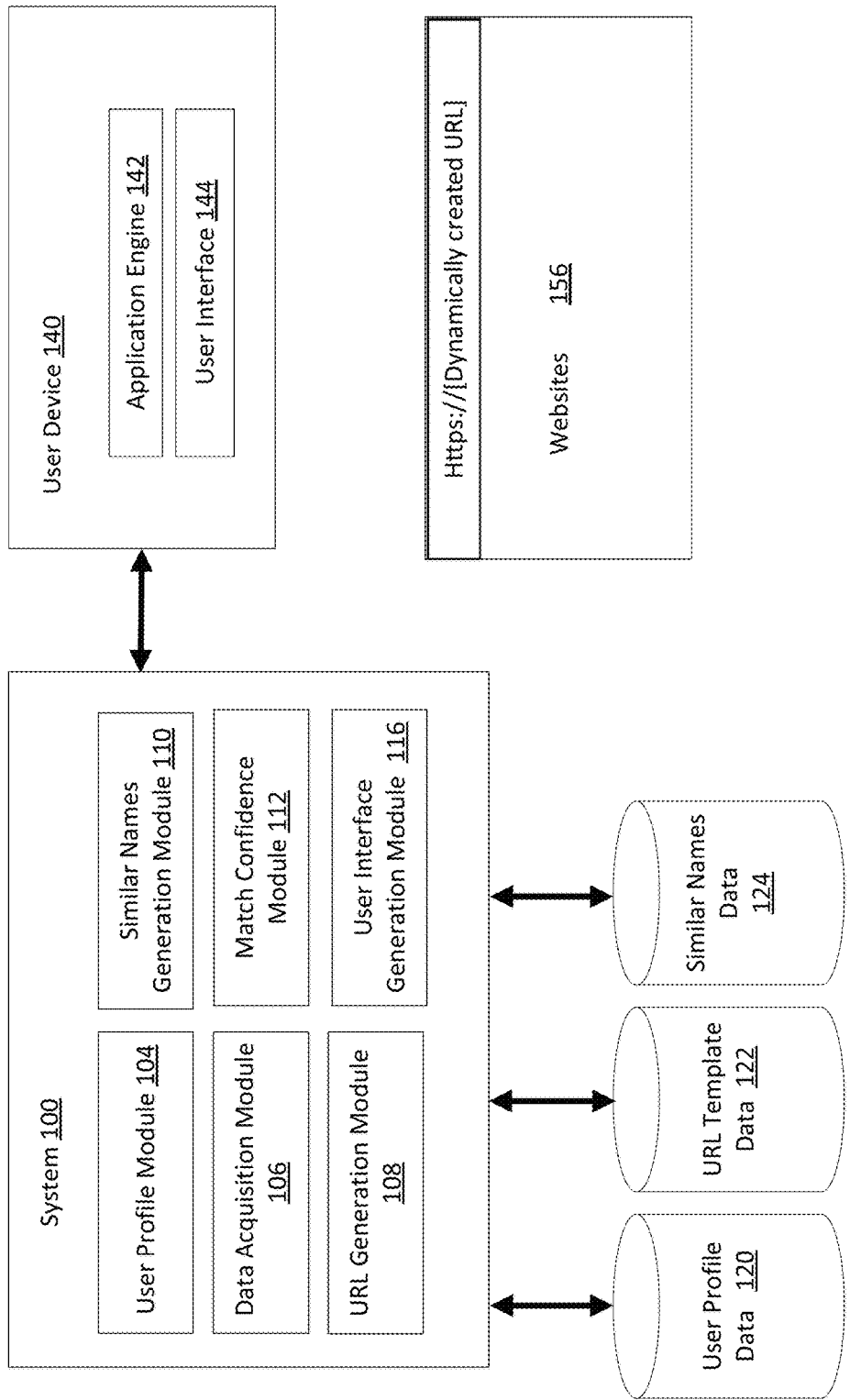
FIG. 1 illustrates a diagram of an example system utilized in creating custom system generated hyperlinks for predefined search queries.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Example System Diagram

FIG. 1 illustrates a diagram of an example system 100 utilized in creating custom system generated hyperlinks for predefined search queries. The system 100 may include a User Profile Module 104, a Data Acquisition Module 106, a URL Generation Module 108, a Similar Names Generation Match Module 110, Match Confidence Module 112 and a User Interface Generation Module 116. A system generated URL for a website is generally shown as reference 156.

While the databases 120, 122, 124 are displayed separately, the databases and information maintained in a database 120, 122, 124 may be combined together or further separated in a manner that promotes retrieval and storage efficiency and/or data security. The databases may include information related to user profile data 120, custom URL template data 122 and similar names data 124.

The User Profile Module 104 may perform functionality related to a storing and retrieving data to the user profile data database 120.

The Data Acquisition Module 106 may perform functionality related to handling communication and receipt and transfer of data received by the system via user interfaces, and for obtaining data from websites.

The URL Generation Module 108 may perform functionality related to dynamically generating URL based on templates for a particular website with user data obtained from the user profile data database 120, and/or from a user interface where data is input by a user.

The Similar Names Generation Module 110 may perform functionality related to generating similar names to a primary name.

The Match Confidence Module 112 may perform functionality related to determining a matched profile confidence score.

The User Interface Module 116 may perform functionality related to rendering and display of information as described herein.

The User Device 140 may have an Application Engine 142 and a User Interface 144. It is understood that the system 100 may further include one or more additional modules for performing, or supporting performance of, any operation(s), step(s), act(s), instruction(s) and process(es) described herein.

Example Process

Figure 2A:
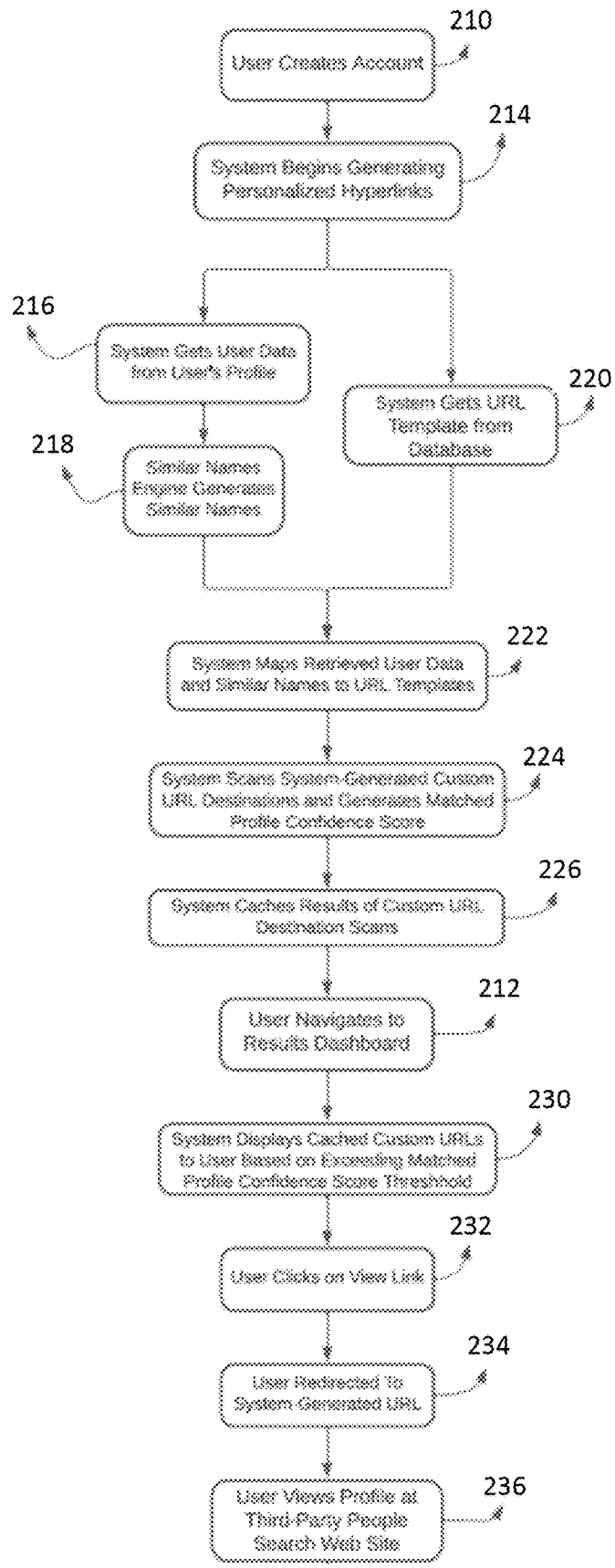
FIG. 2A illustrates an example process of creating custom system generated hyperlinks for predefined search queries.
Figure 2B:
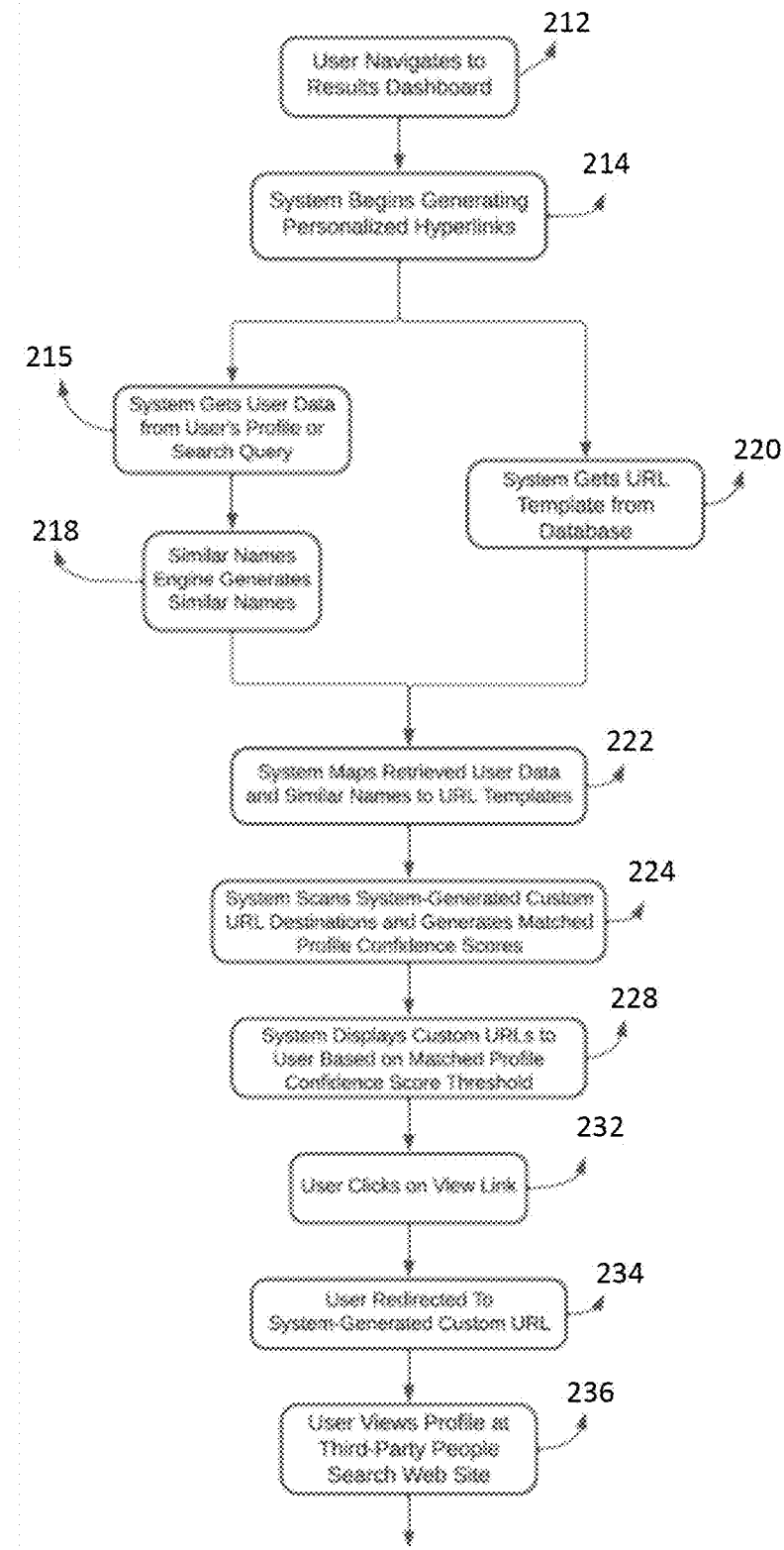
FIG. 2B illustrates an example process of creating custom system generated hyperlinks for predefined search queries.

Referring now to FIGS. 2A and 2B, the figures illustrate an example process for generating custom system generated hyperlinks. The system 100 creates an account by receiving an input via a user interface from a user. The user provides account information such as primary email and password, and submits user profile information such as first name, last name, current city, current state, age, and the profile information of relatives, friends, associates, and other people (Act 210).

The system 1100 provides navigation to a results dashboard (e.g., a user interface listing the dynamically generated URLs) (Act 212). The system 100 then begins generating custom system generated hyperlinks (Act 214).

The system 100 retrieves user data from a user interface with parameters input by a user (Act 215). For example, the system retrieves user profile information, such as first name, last name, city, state and year of birth.

The system 100 retrieves user data from a user's stored profile (Act 216). For example, the system 100 retrieves user profile information from the database, such as first name, last name, city, state and year of birth.

The system 100 generates similar names via the Similar Names Module 110 (Act 218). For example, the system 100 includes a similar names database 124 which provides a mapping table for generating similar names for a given name (e.g., similar names for "Johnathan" would be "John", "Jon", Johnny", "Jonathan", similar names for "Christina" would be "Christy", "Chris", "Christy", "Kristina", "Kris", and "Krissy", and similar names for "Smith" would be "Smithe", "Smyth", and "Smythe"). For example, the system 100 may additional alternate names by comparing a user provided first name and evaluate the name against a similar names database 124 to identify other possible associated names. The similar names database 124 may have records with a lookup name and names associated with the lookup name. For example, the system may query on the name "Johnathan" and return a results list of "John", 'Jon", "Johnny", "Jonathan", etc. Based on the results list, the system may automatically associate the alternative first names for later use by the system when dynamically generating URLs as described herein.

The system 100 retrieves one or more custom Uniform Resource Locator (URL) templates from the URL Template Data database 122 (Act 220). The database 122 includes records with parameters for required data fields that are combined to create a dynamic link for a particular website. These records serve as a template for the generation of the dynamic link to a website. The records in the database 122 each have a unique custom URL template that is created according to the pattern utilized by the corresponding individual people search websites.

The system 100 maps retrieved user data and similar names to the custom URL templates (Act 222). For example, before generating a user interface for a user-facing Results Dashboard, the system 100 populates the retrieved user data and corresponding similar names from the database into each people search directory URL template to create custom URLs for locating that user's profile at each people search website.

The system 100 scans system-generated custom URL destinations and generates matched profile confidence scores (Act 224). For example, the system 100 scans the output response content of each system-generated custom URL destination and generates a matched profile confidence score. If the output response content indicates a "Profile Not Found" or "404 Page Not Found" response, the system 100 would generate a Matched profile confidence score of 0. For example, this situation may occur if the first name and last name of the person is not found on a respective website. The system 100 may review the returned data from the website after sending the dynamically generated URL link, and then scan the returned data for the occurrence of text indicating a low confidence score (such as "Profile Not Found" or "404 Page Not Found, etc.) If the output response content contains a perfect match for a singular profile with the exact same first name, middle name, last name, current city, current state, and age for the user, that would produce a matched profile confidence score of 100.

The matched profile confidence score may be reduced from 100 as the number of profiles in the results at the people search websites increases, and as the number of exact match fails increases at the people search websites for the User Data (e.g. matches for first name, middle name, last name, current city, current state, age, etc.). For example, if a website returns a large number of matches (e.g., as would be expected when using a common name such as John Smith residing in a large population city such as New York, NY), then the system 100 may determine a lower confidence score. The system 100 reduce the score based on the number of returned matches.

The system 100 caches the results of the customer URL destination scans (Act 226). The system 100 stores and caches the results of the custom URL destination scans for display the next time the user requests the Results Dashboard. This functionality prevents the user from having to wait for the custom URL destination scans and the matched Profile Confidence Scoring processes to execute. Results are pre-processed and caches refreshed at regular intervals or whenever the user updates their profile information, whichever occurs first.

The system 100 displays, via user interface, dynamically generated custom URLs to a user based on a matched profile confidence score threshold (Act 228). For example, the system 100 generated custom URLs are presented to the user as clickable hyperlinks for each people search website in the system database whose matched profile confidence score exceeds a chosen threshold (e.g., score greater than 60).

The system 100 displays cached custom URLs to user based on a matched profile confidence score threshold (Act 230). For example, the system generated cached custom URLs are presented, via a user interface, to the user as clickable hyperlinks for each people search website in the system database whose matched profile confidence score exceeds a chosen threshold (e.g., greater than 60).

The system 100 receives via a user interface a user input to select a particular link (act 232). For example, a user clicks View link from the Results Dashboard to view the profile at the people search website.

The system 100 redirects the user to the system generated URL (Act 234). For example, the system 100 sends the user to the system generated custom URL via a user interface, or externally to a web browser page and passes the system generated custom URL to the web browser.

Information for the third-party people search website is then presented to the user (Act 236). For example, the user may view personalized profile information at the linked-to third-party people search website via clickthrough to the custom deep link.

Example System Flow

Figure 3:
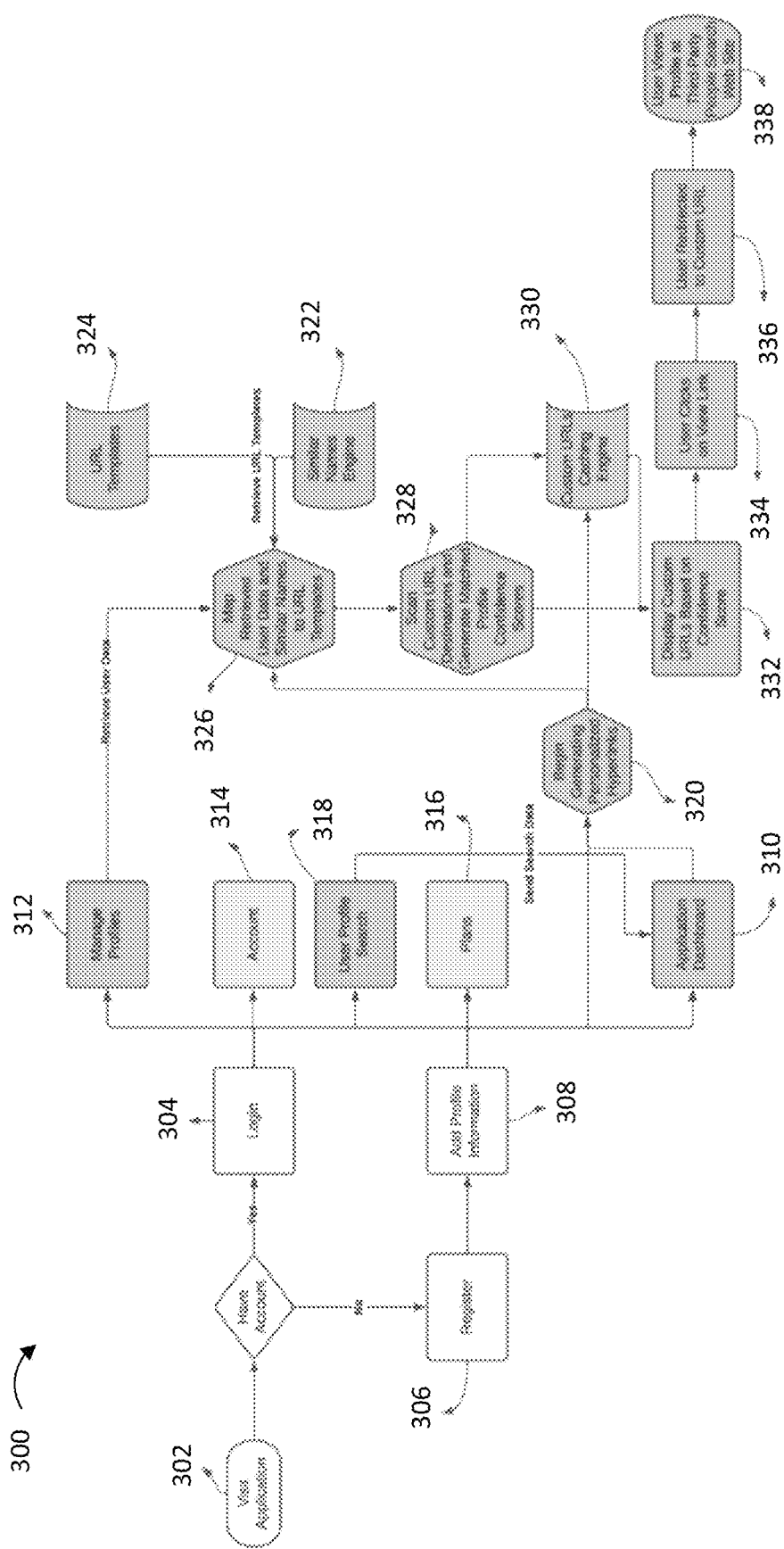
FIG. 3 illustrates an example system flow diagram for creating custom system generated hyperlinks for predefined search queries.

FIG. 3 illustrates an example system flow diagram 300 for creating custom system generated hyperlinks for predefined search queries. A user initiates an application where the user can create account or login to an existing account (302). The user enters into a user interface, the user's credentials, such as user name and password to gain access to the system (304).

If a user needs to register (306) or create a new account, the user provides required information, including: First Name {{first_name}}, Last Name {{last_name}} Email Address {{email}}, and a password.

The system 100 provides functionality allowing a user to add or change additional profile information via user interface (308). After registration the user is prompted to add profile information including: Required: City {{city} }, Required: State {{state}}{{state_full}}, Required: Birth Year {{birth_year} }, Optional: Birth day, Optional: Birth month, Optional: Middle Name {{middle_name}}.

The system 100 generates an application dashboard (310). After creating an account, logging in, or submitting a user profile search, the system 100 displays an application dashboard with a list of all people search websites in the system database and corresponding View links to custom system generated profile results pages at people search websites.

The system 101 provides functionality to manage a user profile (312). A user may view and update profile information for themselves and others from the manage profiles page, which accepts the following information fields. In one embodiment, the system 100 may require certain input of various data fields and optionally require input.

A. Basic User Information (Required and Optional):
  Required: First Name {{first_name}}
  Required: Last Name {{last_name} }
  Optional: Middle Name {{middle_name}}–Required:
    Birth Year {{birth_year}}
  Optional: Birth day
  Optional: Birth month
  Optional: Date of birth {{dob} }
B. Additional Info (Optional):
  Gender
  Nickname/Other names {{first_name}} {{last_name}} {{middle_name}}
  Additional Emails {{email}}
  Phone numbers {{phone}}
C. Addresses:
  Current Primary Address (Required)
    Optional: Address 1
    Optional: Address 2
    Required: City {{city}}
    Required: State {{state}} {{state_full}}
    Optional: Zip {{zipcode}}
  Additional addresses (Optional)
    Address 1
    Address 2
    City {{city}}
    State {{state}} {{state_full}}
    Zip {{zipcode}}
D. Relatives and Associates Names
  (Optional): —First Name {{first_name}}
  Middle Name {{middle_name}}
  Last Name {{last_name}}

The system 100 provides functionality where registered users may view and update their Account information related to system Plans & Billing, Notification Preferences, Login & Security, Account Deletion (314).

The system 100 provides functionality where registered users may also view, upgrade, or downgrade paid subscription plans (316).

The system 100 provides functionality where a user can search for profiles at people search directories by submitting pre-defined search queries (318), including the following fields:
  First Name {{first_name} }
  Last Name {{last_name}}
  Email {{email}}
  City {{city} }
  State {{state} } {{state_full}}
  Birth Year {{birth_year}}
  Birth day
  Birth month
  Date of birth {{dob} }
  Middle Name {{middle_name} }

The system 100 provides functionality to generate custom system generated hyperlinks (e.g., customized URL links) (320).

The system 100 provides functionality to generate similar names (322). For example, the Similar names Generation Module 110 may utilize a mapping table to produce similar names for a given name, e.g., similar names for "Johnathan" would be "John", "Jon", Johnny", "Jonathan", similar names for "Christina" would be "Christy", "Chris", "Christy", "Kristina", "Kris", and "Krissy", and similar names for "Smith" would be "Smithe", "Smyth", and "Smythe".

The system 100 includes functionality for management and storage of custom URL templates (324). For example, each people search website record in the system database has a unique URL template that may be customized according to the pattern utilized on each individual people search website.

The system 100 maps retrieved user data and similar names to custom URL templates (326). For example, prior to rendering the user-facing Results Dashboard, the System populates the retrieved user data and corresponding similar names from the database, or from the pre-defined search query, into each people search directory URL template to create custom URLs for locating that user's profile at each people search website.

The system 100 provides functionality to scan custom URL destinations and generate matched profile confidence scores (328). For example, the system 100 scans an output response content of each system generated custom URL destination and generates a matched profile confidence score, e.g. if the output response content indicates a "Profile Not Found" or "404 Page Not Found" response, that would produce a matched profile confidence score of 0, if the output response content contains a perfect match content for a singular profile with the exact same first name, middle name, last name, current city, current state, and age for the user, that would produce a matched profile confidence score of 100. The matched profile confidence score is reduced from 100 as the quantity of profiles in the results at the people search websites increases, and as exact match fails increase at the people search websites for the user information (e.g., matches for first name, middle name, last name, current city, current state, age, etc.).

The system 100 provides functionality to store and cache custom URLs (330). For example, the system 100 stores and caches the results of the custom URL destination scans for immediate display the next time the user requests the Results Dashboard. This prevents the user from having to wait for the custom URL destination scans and the matched profile. The system 100 performs a confidence scoring processes. The results are re-processed and the system caches are refreshed at regular intervals or whenever the user updates their profile information, whichever occurs first.

The system 100 provides functionality to display custom URLs based on the generated confidence score (332). The system generated custom URLs are presented to the user as clickable hyperlinks for each people search website in the System database whose matched profile confidence score exceeds a chosen threshold (e.g., score greater than 60).

The system 100 provides functionality for a user to click and/or select a custom URL link (334). For example, a user may click on a link presented via a user interface, such as a Results Dashboard to view the profile at the people search website. The user is redirected to the custom URL (336).

The system 100 provides functionality to view a website where the custom URL has been used to access the website (338). For example, a user may view personalized profile information at the linked-to third-party people search website via a custom deep link.

Example Sequence Diagram

Figure 4:
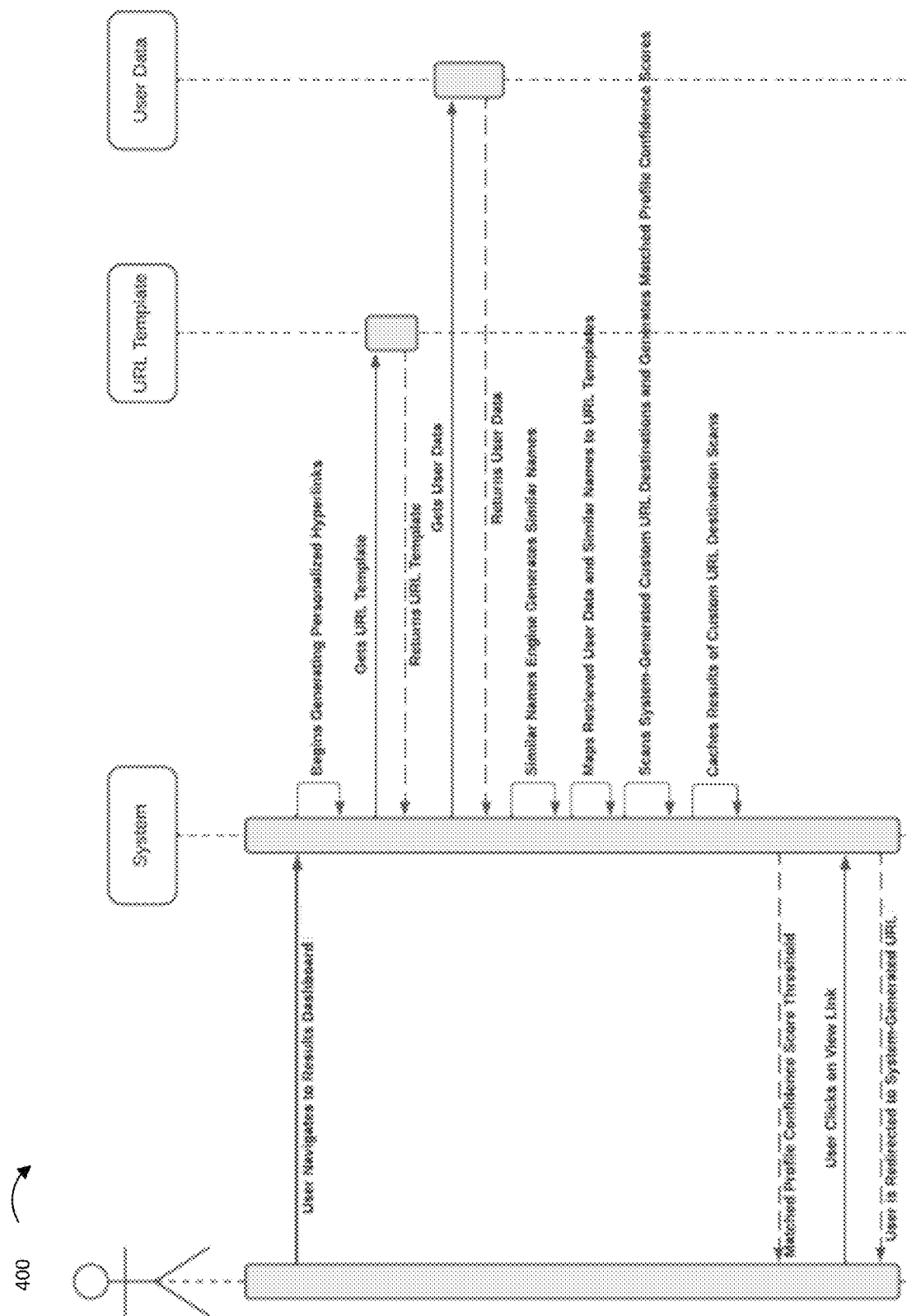
FIG. 4 illustrates a sequence diagram for creating custom system generated hyperlinks for predefined search queries.

FIG. 4 illustrates a sequence diagram for creating custom system generated hyperlinks for predefined search queries. As illustrated in the diagram, a user navigates to a results dashboard. The system 100 begins generating custom system generated hyperlinks. The system 100 accesses the custom URL templates stored in the URL Template data 122 database, and the custom URL templates are retrieved. The system 100 obtains user data from either the user profile data database 120, or from a user interface where a user has input various required data describing the user. The system 100 then generates, via the similar names generation module, similar names to the names of the user. The system 100 maps retrieved and/or the generated similar names to the retrieved custom URL templates. The system 100 generates custom URLs and evaluates the system generated custom URLs and determines a matched profile confidence score. The system 100 caches the results of the custom URLs. The system 100 presents via a user interface those custom URLs where the matched profile confidence score is above a predetermined value. The system 100 receives a selection of one or more of the custom URLs. When clicked on by the user, the system 100 directs the user to the website pertaining to the custom URL link.

Example Process

Figure 5:
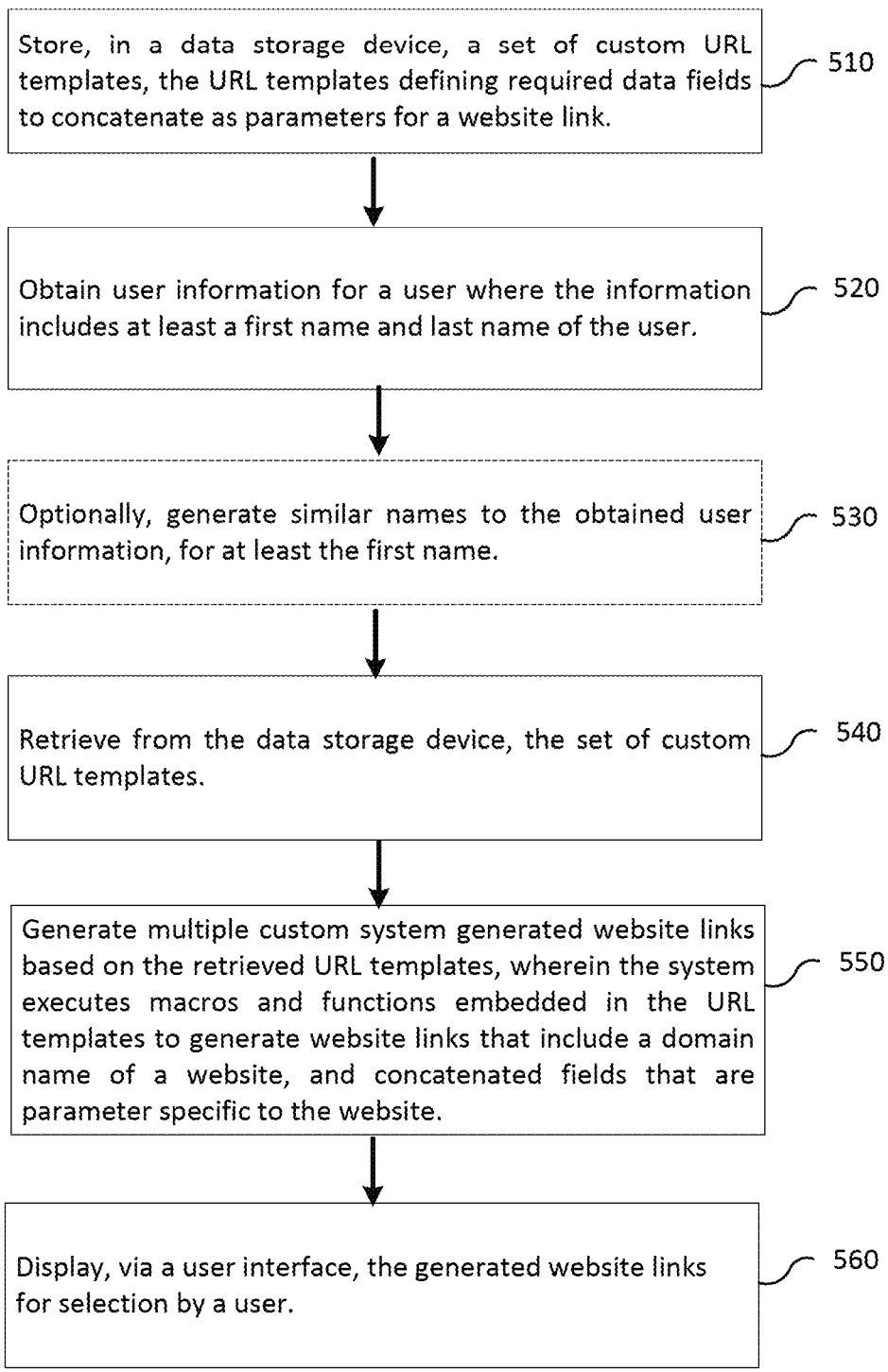
FIG. 5 illustrates an example of process of creating custom system generated hyperlinks for predefined search queries.

FIG. 5 illustrates another example of process of creating personalized hyperlinks for predefined search queries.

The system 100 may store, in a data storage device, a set of custom URL templates, the URL templates defining required data fields to concatenate as parameters for a website link (act 510). Each custom URL template may be composed of a string of text in which the parameters of the required data fields are concatenated as parameters to form a website link. For example, the custom URL templates may include a domain name (or an IP Address) of a website, one or more macros, one or more functions, and other static text. Each URL template may include a single required data field. Alternatively, each URL template may include a plurality of required data fields. In addition, the required data fields that are included in each URL template may vary based on the URL template. For example, a first URL template may include a first required data field and a second URL template may include a second required data field different from the first required data field. In addition, the syntax of each parameter concatenated into the URL template may vary based on the URL template. For example, if a required data field is a user's birthday (i.e., Dec. 14, 1975), then a parameter of the required data field of the user's birthday may be concatenated with a first syntax for a first URL template (i.e., "12141975") or may be concatenated with a second syntax for a second URL template (i.e., "121475").

The system 100 may obtain user information for a user where the information includes at least a first name and last name of the user (act 520). The user information may be obtained from a local storage device. Alternatively, the user information may be obtained directly from a user inputting the user information into an input device (e.g., a keyboard). For example, the system 100 may generate various user interfaces to receive data from a user about name and other information associated with the user, and the system may prompt the user to input and submit the user information.

Optionally, the system 100 generates similar names to the obtained user information, for at least the first name (act 530). The system 100 may use, for example, an input first name of the user and determine additional related first names (e.g., nick names or alternative spellings). The system 100 may associate the alternative names with the user and then later use these alternative first names when generating a custom URL link. For example, if the obtained user information is a first name of "Phillip", then similar names, such as "Phil" and "Philip" may be generated.

The system 100 may retrieve the from the data storage device the set of custom URL templates (act 540). The URL templates may be retrieved in response to a user selection. Alternatively, the URL templates may automatically be retrieved once the user information is obtained. In addition, the user may identify particular websites to retrieve URL templates that correspond to the particular websites identified by the user.

The system 100 may generate multiple website links based on the retrieved custom URL templates, where the website links each include a domain name (or an IP Address) of a website, and one or more concatenated fields generated by macros, functions, and/or static text that are parameter specific to the website (act 550). For example, a first generated website link may include a domain name of a first website (e.g., "spokeo.com") and a parameter concatenated field specific to the first website (e.g., a birthday of "12141975"), and a second generated website link may include a domain name of a second website (i.e., "mylife.com") and a parameter concatenated field specific to the second website (i.e., a birthday of "121475").

Optionally, the system 100 may determine a confidence score for the generated custom URL links. The system 100 may generate a confidence score for the generated custom URL link by processing the link from the system to the respective website and then evaluating the return data from the website, such as indications that the user's name was not found, and/or based on the number of distinct user results listings returned by the website.

The system 100 displays via a user interface the generated website links for selection by a user (act 560). The system 100 may display one or more website links based on the generated custom URL links.

Example Custom URL Template

The system 100, via the URL Generation Module 108, may perform the URL generation process using macros for various fields. Table 1 illustrates various macro functions that may performed on user data for a custom URL template.

TABLE 1

Macro Functions

| Field | Macro | Description |
|---|---|---|
| First Name | {{first_name}} | Populates the first name from the user profile or search query. |
| Last Name | {{last_name}} | Populates the last name from the user profile or search query. |
| Middle Name | {{middle_name}} | Populates the middle name from the user profile or search query. |
| Middle Initial | {{middle_initial}} | Populates the middle initial from the user profile or search query. |
| State | {{state}} | Populates the two-character symbol for state from the user profile or search query, e.g.. NY, CA, TX, IL. |
| Full State Name | {{state_full}} | Populates full state name from the user profile or search query, e.g., New York, California, Texas, Illinois. |
| City | {{city}} | Populates city from the user profile or search query. |
| Zip Code | {{zipcode}} | Populates zip code from the user profile or search query. |
| Age | {{age}} | Populates age from the user profile or search query. The age is calculated using the current date and the birth date. If only the birth year is provided, an approximate age is calculated by subtracting the birth year from the current year. |
| Birth Year | {{birth_year}} | Populates birth year from the user profile or search query. |
| Email | {{email}} | Populates the primary email address from the user profile or search query. |
| Email Opt-out | {{email_optout}} | Populates a System-generated proprietary email address that is used for submitting opt out requests and creating accounts on behalf of users at third party data brokers. |
| Phone Number | {{phone}} | Populates phone number from the user profile or search query. |

The system 100 may perform data transformation functions on the user data. Table 2 illustrates various data transformation functions that may performed on the user data.

TABLE 2

Example Data Transformation Functions

| Function | Description |
|---|---|
| |plus | Replaces spaces in user data with the plus symbol (e.g., transforms "North Carolina" to "North+Carolina"). |
| |dash | Replaces spaces in user data with the dash symbol (e.g., transforms "North Carolina" to "North-Carolina"). |
| |underscore | Replaces spaces in user data with the underscore symbol (e.g., transforms "North Carolina" to "North_Carolina"). |
| |htmlspace | Replaces spaces in user data with the URL encoded space character (e.g., transforms "North Carolina" to "North %20Carolina"). |
| |lower | Transforms user data to lower case characters (e.g., transforms "North Carolina" to "north Carolina"). |
| |title | Transforms user data to title case characters (e.g., transforms "north Carolina" to "North Carolina"). |
| |upper | Transforms user data to upper case characters (e.g., transforms "North Carolina" to "NORTH CAROLINA"). |
| |strip_phone | Removes non-numerical characters from a phone number (e.g., transforms "(646)-123-4567" to "6461234567"). |

Table 3 illustrates examples of URL templates and dynamically custom generated URLs for a user for different websites. In the examples, the received query data or stored user profile data retrieved from the user profile data database 120 includes the First Name "Richard", the Last Name "Smith", and the Age "44" and the city "Chapel Hill", and the State "NC".

TABLE 3

Example Custom URL Templates and Generated URLs

| Custom URL Template | System Generated Custom URL Link |
|---|---|
| https://www.411.com/name/{{first_name}}-{{last_name}}/{{city\|dash}}-{{state}}?minAge={{age\|add:-2}}&maxAge={{age\|add:2}} | https://www.411.com/name/Richard-Smith/Chapel-Hill-NC?minAge=42&maxAge=46 |
| https://veripages.com/profile/search?fname={{first_name)}&lname={{last_name}}&state={{state}}&city={{city\|plus}} | https://veripages.com/profile/search?fname=Richard&lname=Smith&state=NC&city=Chapel+Hill |
| https://www.usphonebook.com/{{first_name}}-{{last_name}}/North%20Carolina/Chapel%20Hill | https://www.usphonebook.com/Richard-Smith/North%20Carolina/Chapel%20Hill |
| https://www.intelius.com/results/?firstName={{first_name}}&middleInitial={{middle_initial}}&lastName={{last_name}}&city={{city\|plus}}&state={{state}}&age={{age}} | https://www.intelius.com/results/?firstName=Richard&middleInitial=S&lastName=Smith&city=Chapel+Hill&state=NC&age=44 |
| https://www.beenverified.com/app/search/person?age={{age}}&city={{city}}&fname={{first_name}}&ln={{last_name}}&mn={{middle_initial}}&state={{state}} | https://www.beenverified.com/app/search/person?age=44&city=Chapel%20Hill&fname=Richard&ln=Smith&mn=S&state=NC |

The system 100 via the URL Generation Module 108 generates URLs by using the information entered via the various user interfaces of the system. A custom URL template may include the domain name (or an IP Address) of a web site and then include macros from Table 1 and functions from Table 2. For example, the system 100 may read a data field from the User Profile Data database 120 and map the data value of respective fields of the database to the macros identified in Table 1 with respect to macro requirements as defined for a particular custom URL template.

When generating a custom URL link, the system 100 uses the input user data and applies a respective field to a corresponding macro name(s) that are part of the custom URL template. For example, the user may input a first name and a last name via a user interface. The system 100 either may store the input information in a database, or temporarily use the information (such as through a search or query interface). The input first name would be mapped to the macro {{first_name}} and the input last name would be mapped to the macro {{last_name}}.

The system 100 may use functions to perform data transformation on a macro or combined macros. For example, the function {{macro1}}|plus{{macro2}} would add a "+" symbol between the fields represented by {{macro1}} and {{macro2}} to generate a concatenated text string. Additionally, the URL template may include other static text in the template that may be needed for generating the custom URL.

Figure 6A:
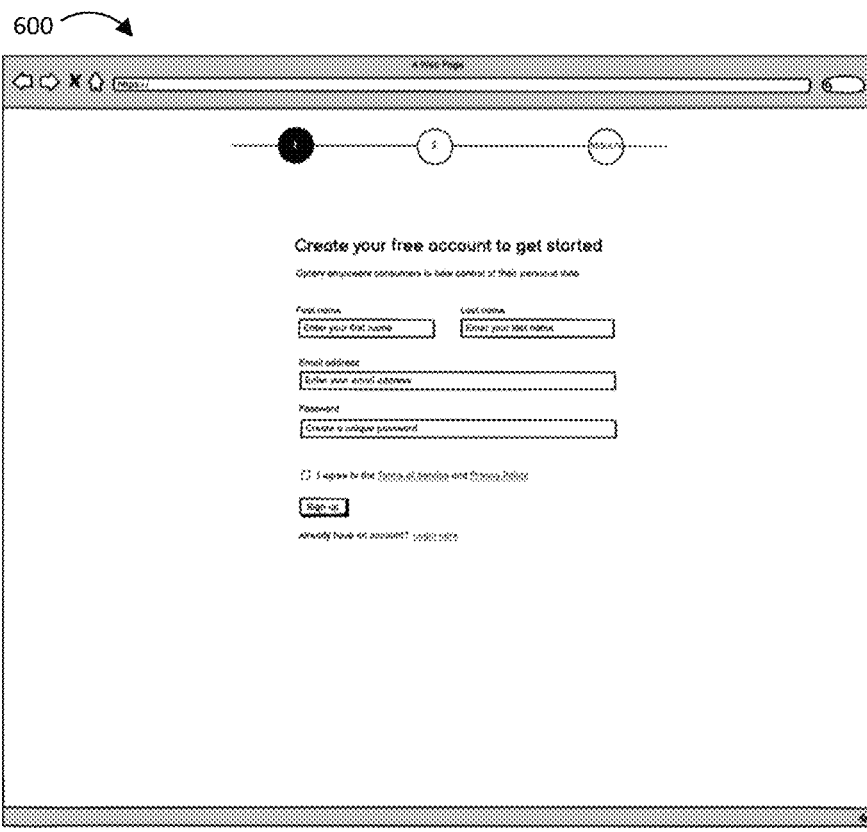
FIGS. 6A-6B illustrate example user interface according to embodiments of the present disclosure.

FIG. 6A illustrates an example user interface 600 according to one embodiment of the present disclosure. The system 100 generates the user interface 600 when a user creates an account. The user profile module 104 obtains information about a user including a data value for each of the fields: first name, last name, email address and a password. In the example embodiment, each of the fields are required to be input by the user. The system 100 stores the obtained data values in the user profile data database 120. The system 100 may use the information the information input by the user, and received via user interface 600, for generating custom URL links.

Figure 6B:
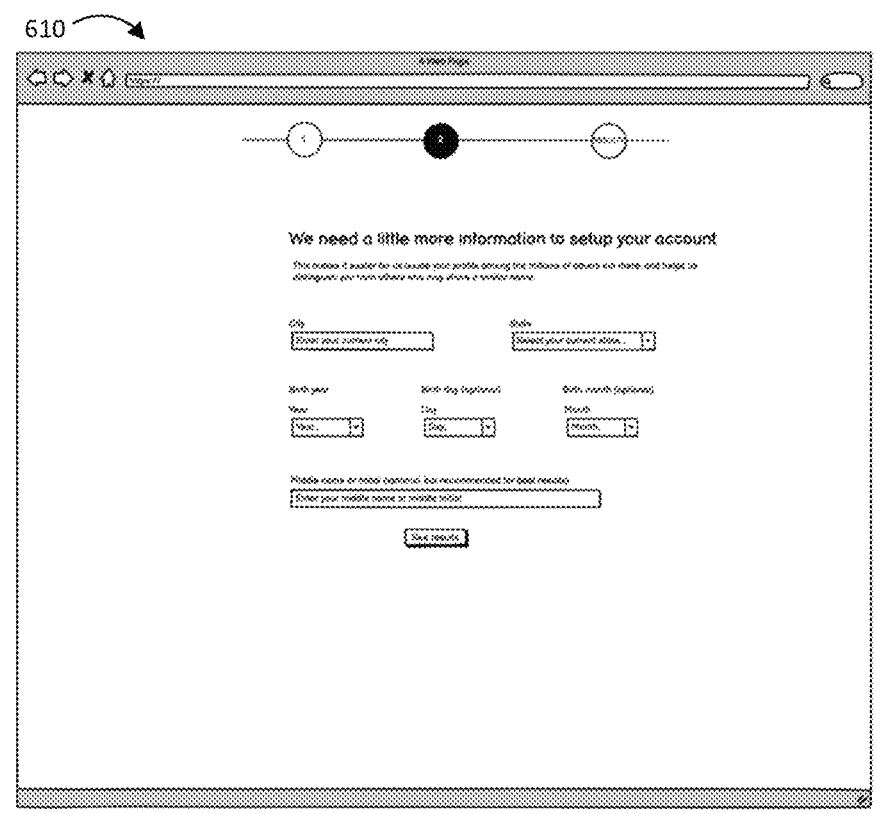

FIG. 6B illustrates an example user interface 610 according to one embodiment of the present disclosure. The system 100 generates the user interface 610 after the user has provided initial user information requested in the user interface 600. The user profile module 104 obtains additional information about a user including a data value for each of the following fields: city, state, birth year, birth day, birth month and middle name. In the example embodiment, the fields for birth day, birth month, and middle name or middle initial are optional fields. The system 100 may use the information input by the user, and received via user interface 610, for generating custom URL links.

Figure 7:
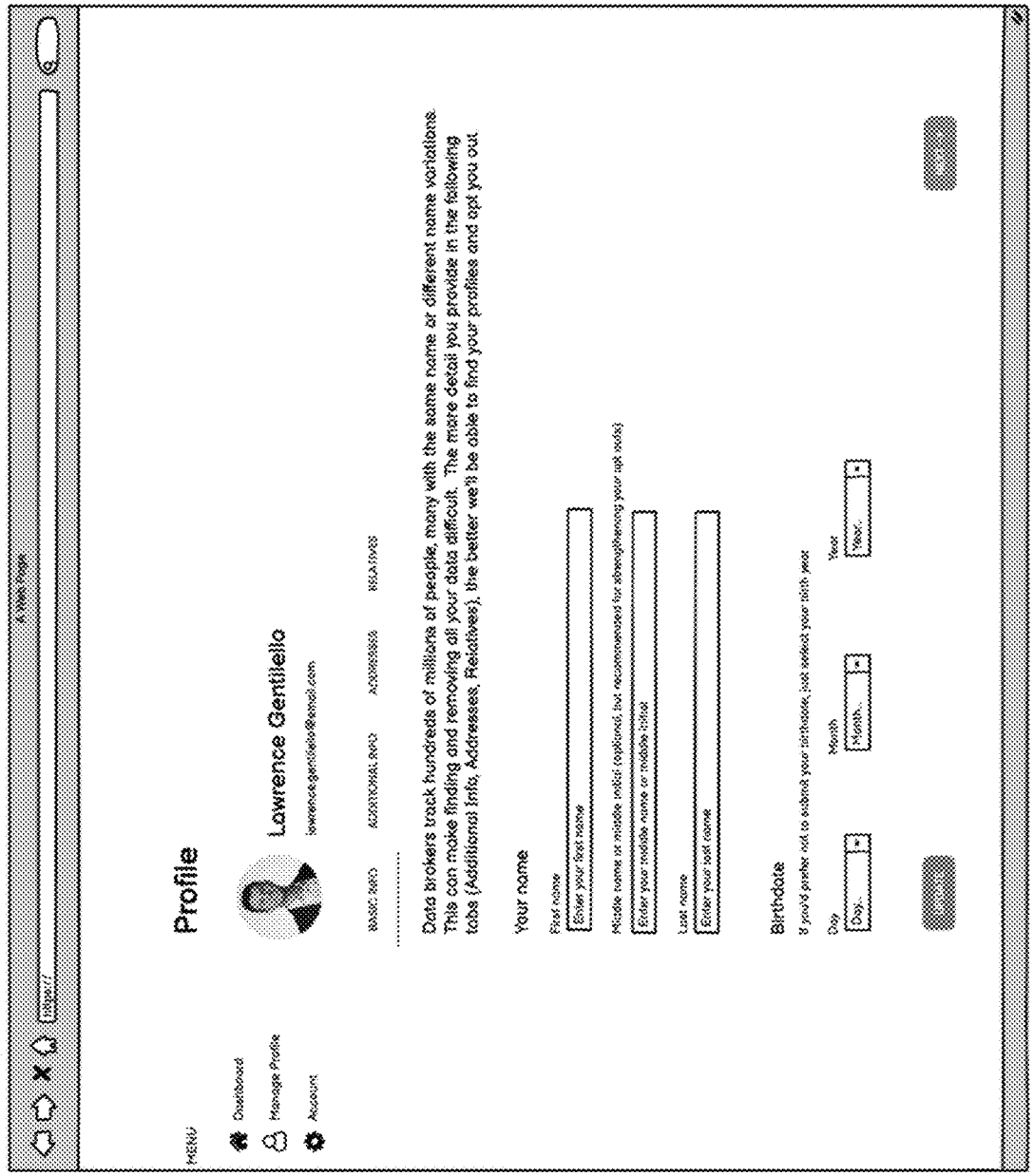
FIG. 7 illustrates an example user interface according to one embodiment of the present disclosure.

FIG. 7 illustrates an example user interface 700 according to one embodiment of the present disclosure. The system 100 generates the user interface 700 allowing a user to update or change profile information about the user. In this example, the user may add or modify data values for their first name, middle name or initial, last name and birth date. The system 100 may use the information input by the user, and received via user interface 700, for generating custom URL links.

Figure 8:
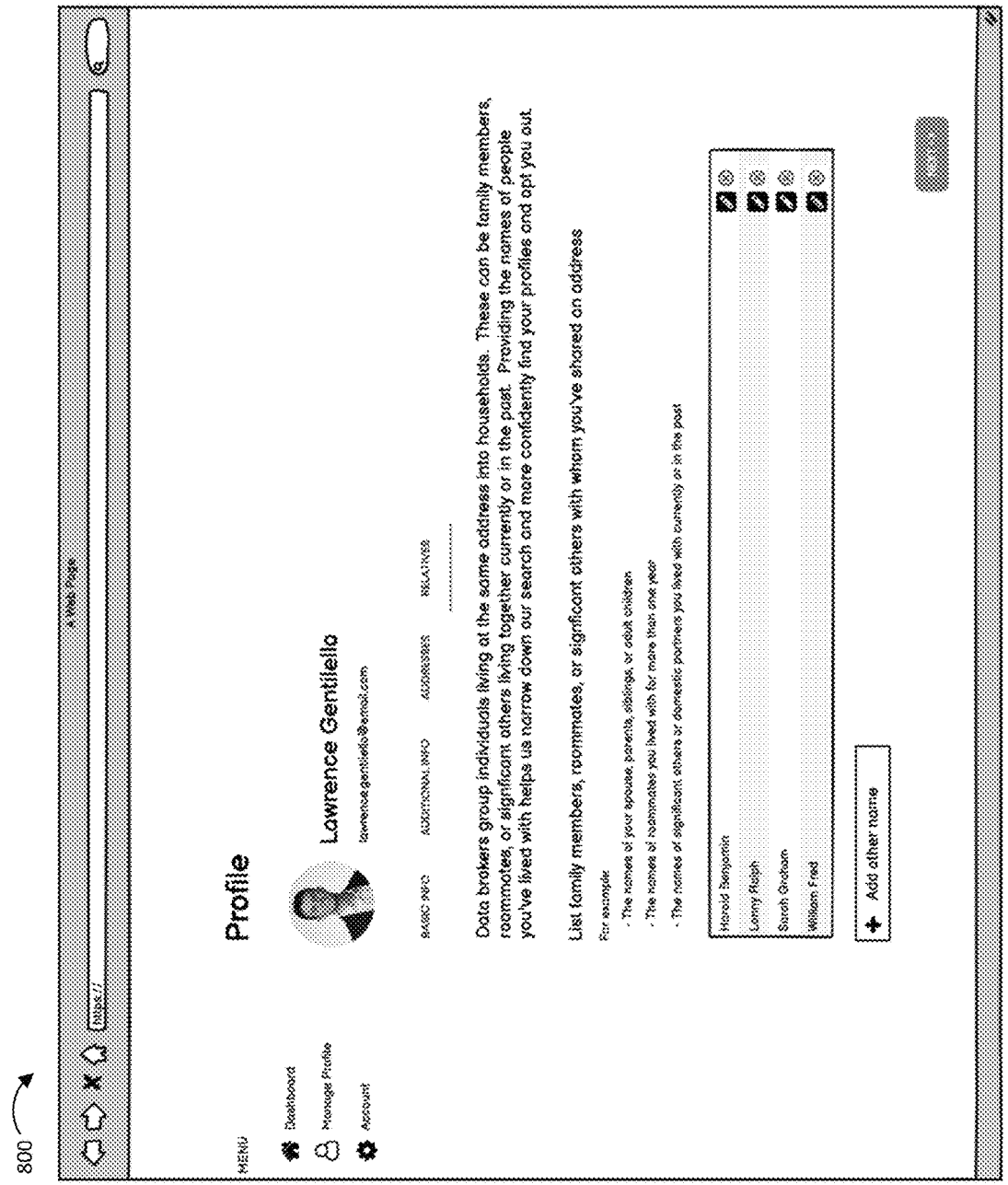
FIG. 8 illustrates an example user interface according to one embodiment of the present disclosure.

FIG. 8 illustrates an example user interface 800 according to one embodiment of the present disclosure. The system 100 generates the user interface 800 allowing a user to update or change profile information about the user. In this example, the user may add or modify information about relatives, significant others and/or people with whom the user has shared an address. The user interface allows for the addition of multiple relatives or associates. The system 100 would update the user profile data database 120 with the added relative and/or associates information. The relative and/or associates information may include for example, the relatives first name and last name and current or past city and state. The system 100 may use the information input by the user, and received via user interface 800, for generating custom URL links.

Figure 9:
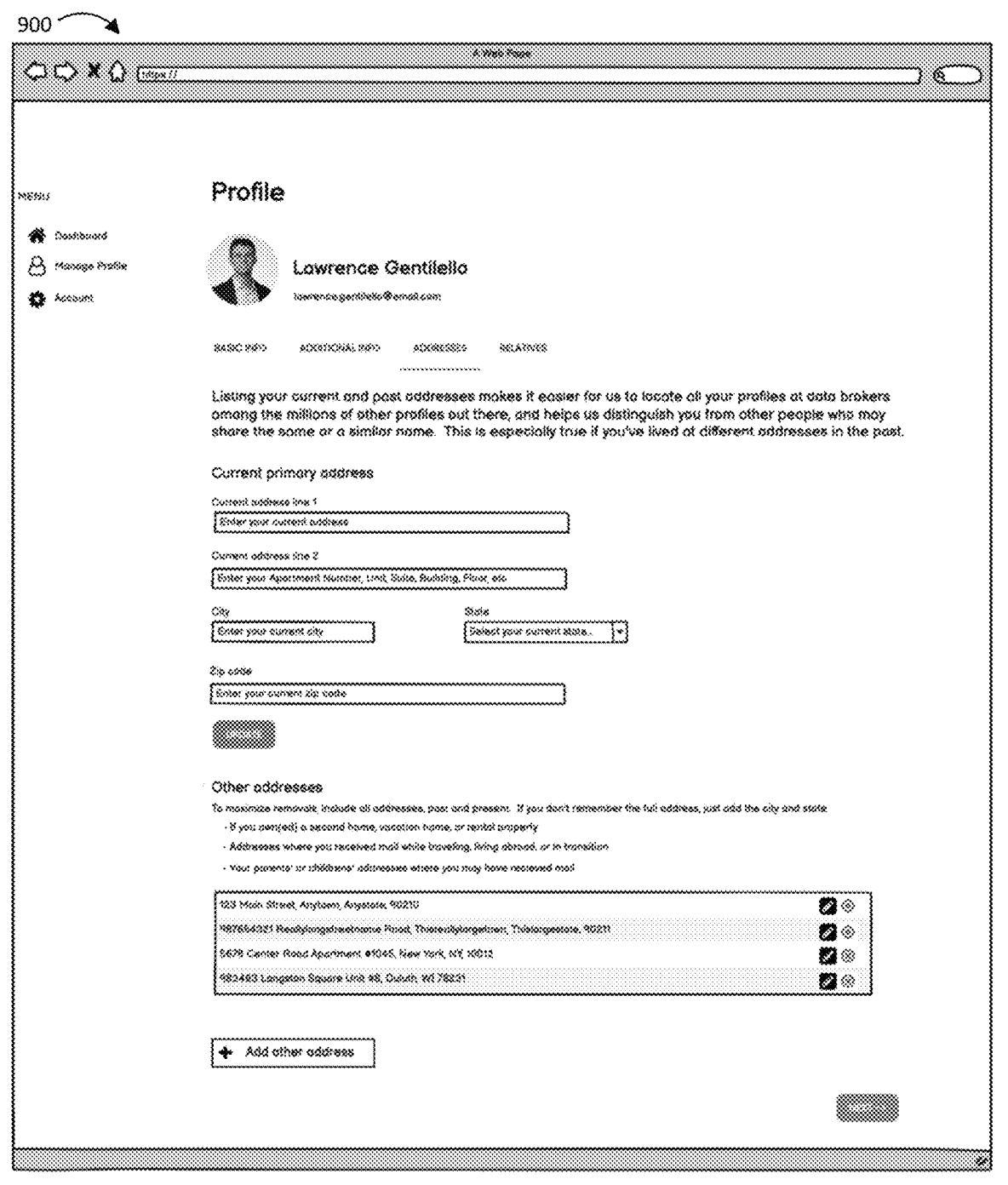

FIG. 9 illustrates an example user interface 900 according to one embodiment of the present disclosure. The system 100 generates the user interface 900 allowing a user to update or change profile information about the user. In this example, the user may add or modify information about their address. The user may add a current primary address and may add other addresses where the user has lived and/or has received mail. The system 100 may use the information input by the user, and received via user interface 900, for generating custom URL links.

Figure 10:
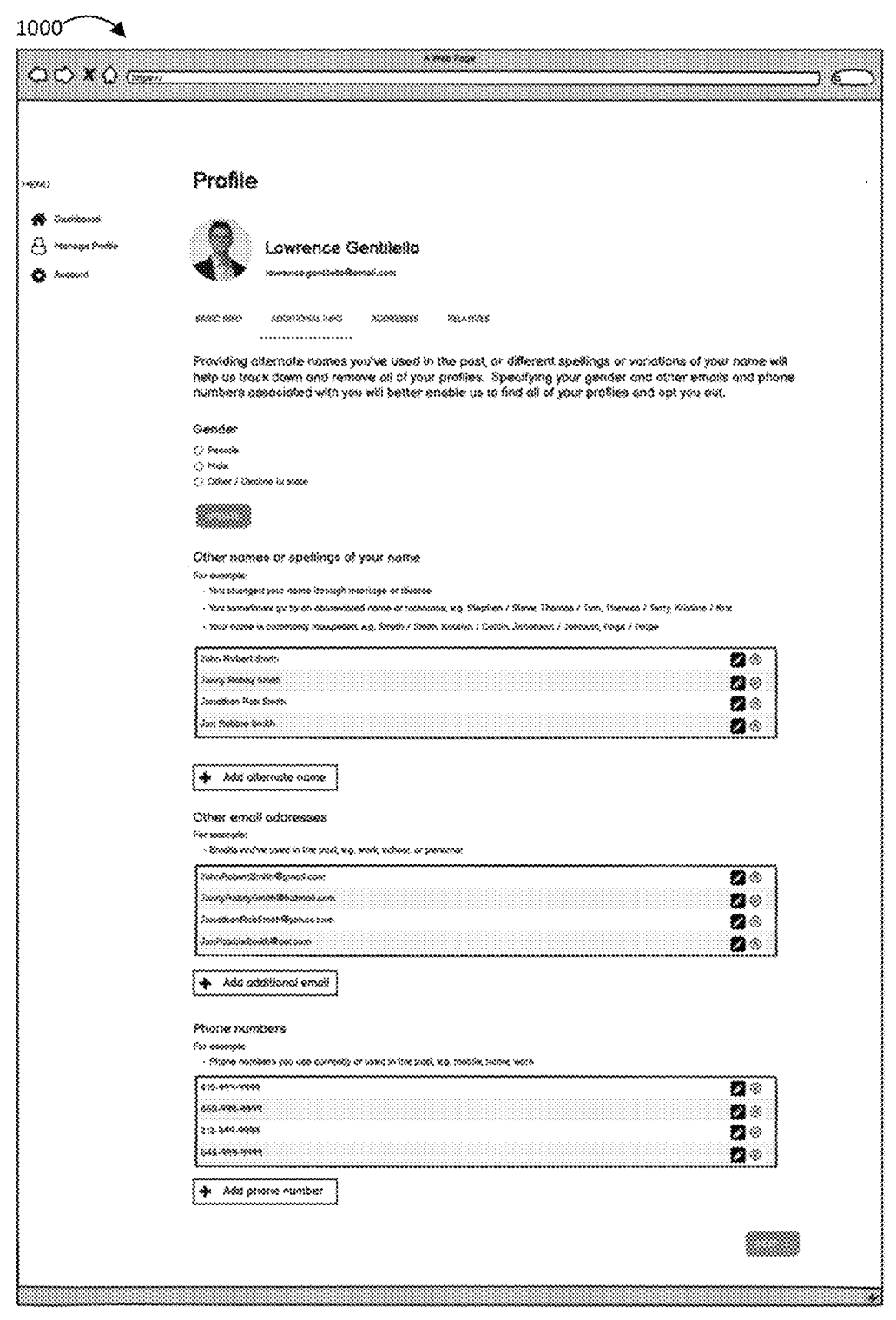

FIG. 10 illustrates an example user interface 1000 according to one embodiment of the present disclosure. The system 100 generates the user interface 100 allowing a user to update or change profile information about the user. In this example, the user may add or modify additional information about the user. For example, the user may add their gender, other names or spellings of their name, email address and/or phone numbers. The system 100 would update the user profile data database 120 with the added additional information. The system 100 may use the information input by the user, and received via user interface 1000, for generating custom URL links.

Figure 11:
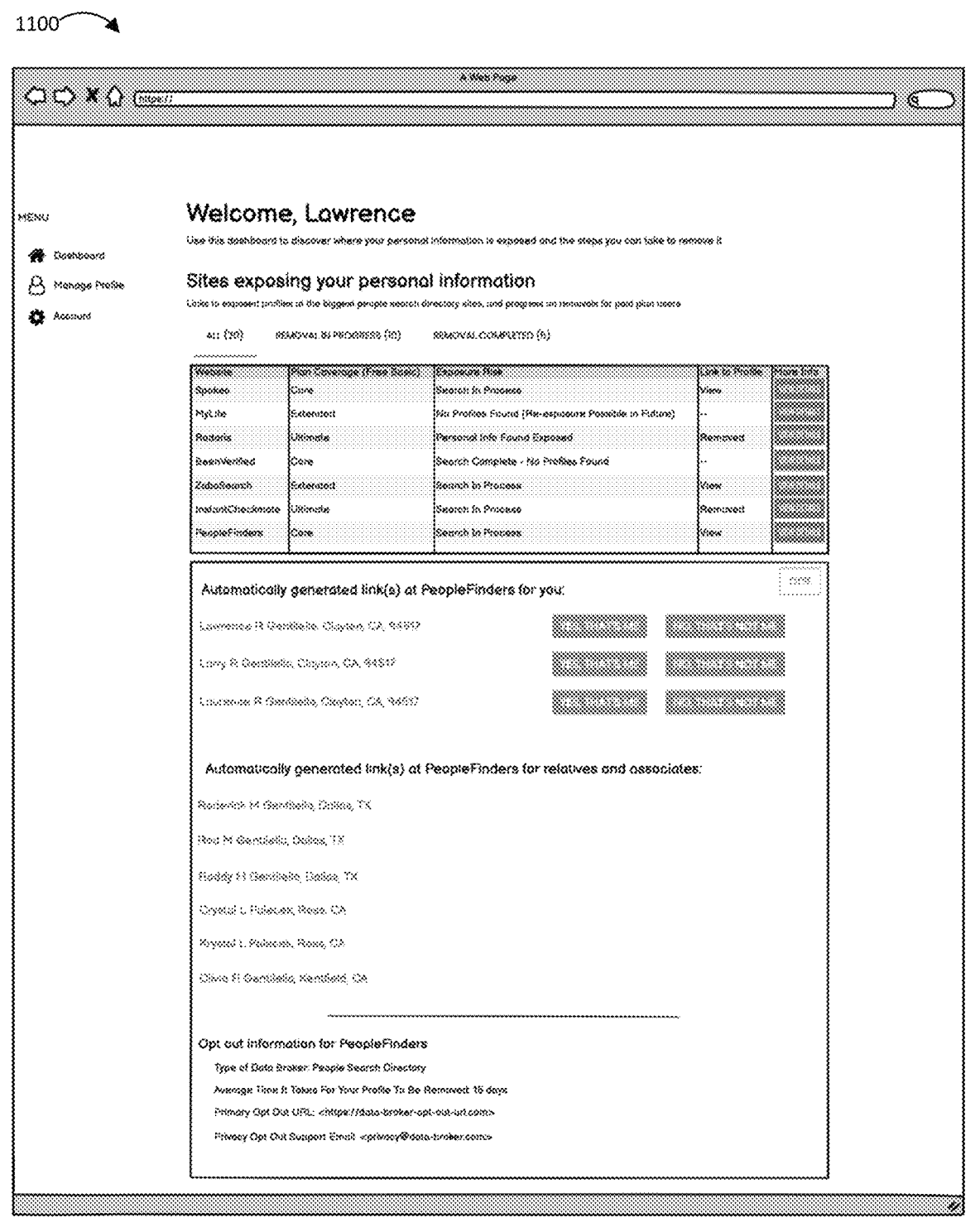

FIG. 11 illustrates an example user interface 1100 according to one embodiment of the present disclosure. The system 100 generates the user interface 1100 allowing a user to view and select the dynamic URL links that were generated by the system 100. For example, the user interface may include a section that displays a listing of various people search websites (e.g., Spokeo.com, MyLife.com, InstantCheckmate.com, BeenVerified.com, Intelius.com, Radaris.com, etc.). The user interface 1100 may include a corresponding graphical affordance (such as an embedded link) for the respective websites where a user may select the graphical affordance which then directs the user to the particular website using the website link with concatenated fields that are germane to the particular website.

As described above, the system 100 allows for the input by a user, via a user interface, additional names of the user (e.g., FIG. 10). Also, the system 100, via the similar names generation module 110, may determine additional first names that are similar to the first name as input by the user. For each similar first name and the same last name associated with the user, the system 100 may generate a dynamic URL Link using a custom URL template for a respective website. For example, a user may have input a first name of "Richard". The user may have optionally entered in an alternative first name "Rick" and/or the system 100 may have generated other similar first names for "Richard" such as "Rich", "Rickie", or "Richie". When generating a dynamic URL for the user, the system 100 may create multiple dynamic URLs for a website. In the example table below, a dynamic URL is created for "Richard", "Rick" and "Richie".

user interface 1100 includes a section for displaying automatically generated links for relatives and associates. Similar to the generation for the primary user, the system 100 using the custom URL template may generate custom URL links for other identified individuals that are related.

In one embodiment, the Data Acquisition Module 106 may be configured to periodically generate custom URL links for one or more users. For example, a user may be scheduled for a periodic update of information. The system 100 may periodically generate custom URL links for the user, and then the system 100 may scan the content residing at the output of the custom URL links at their respective websites. The system 100 may optionally then store some or part of the returned information received from the websites and processed by the system. The system 100 may also perform match confidence scoring as described above, and store in a system database the confidence scores for the respective website in association with the displayed user information. The generated scoring results may then be accessed and presented to the user via a user interface of the system 100.

Example Computer System

Figure 12:
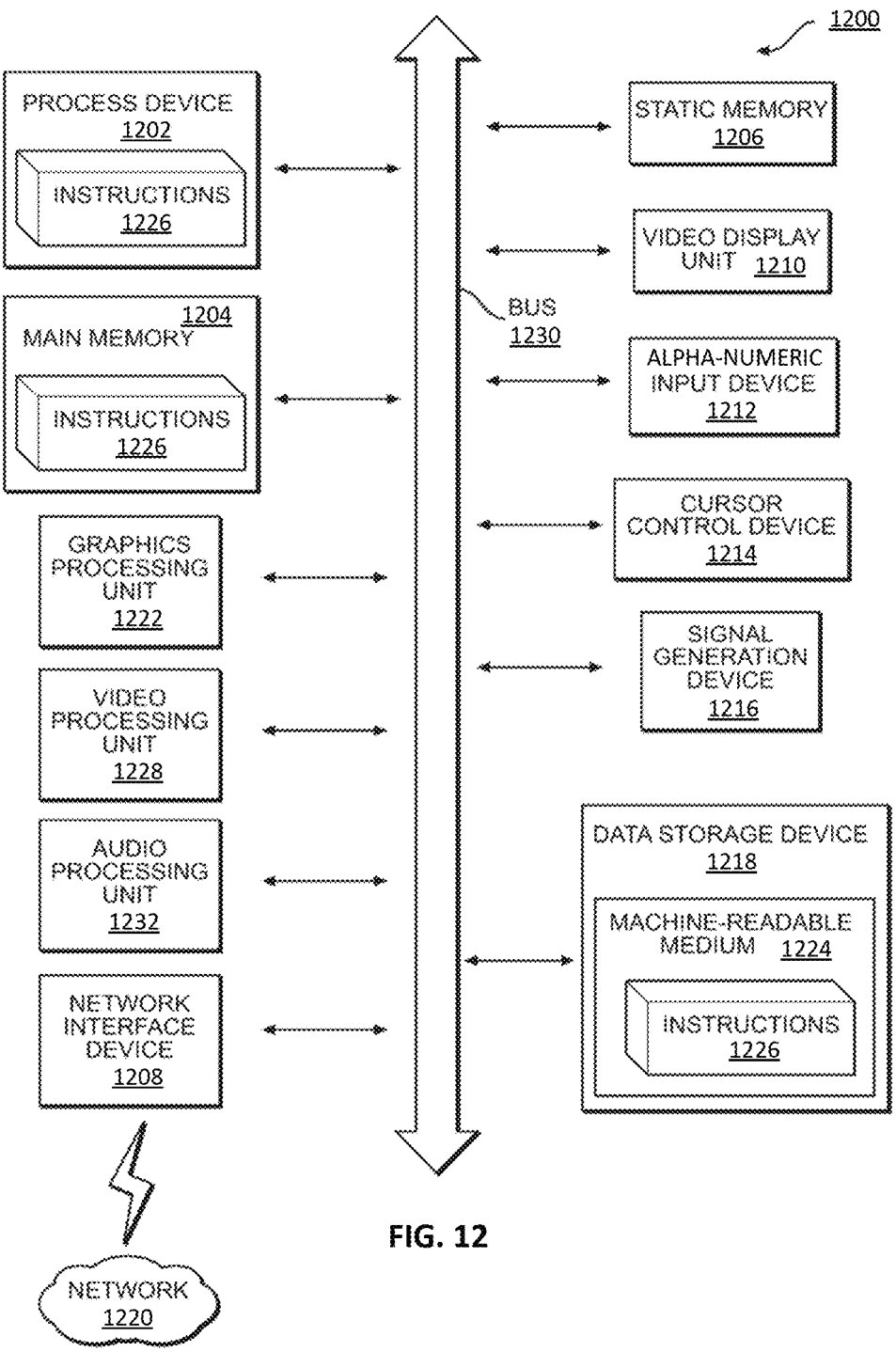
FIG. 12 illustrates a diagram of an exemplary environment in which some embodiments may operate.

FIG. 12 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that indi-

TABLE 4

Example Custom URL Templates and Generated URLs (Similar Names)

| Custom URL Template | System Generated Custom URL Link |
|---|---|
| https://www.411.com/name/{{first_name}}-{{last_name}}/{{city\|dash}}-{{state}}?minAge={{age\|add:-2}}&maxAge={{age\|add:2}} | https://www.411.com/name/Richard-Smith/Chapel-Hill-NC?minAge=42&maxAge=46 |
| https://www.411.com/name/{{first_name}}-{{last_name}}/{{city\|dash}}-{{state}}?minAge={{age\|add:-2}}&maxAge={{age\|add:2}} | https://www.411.com/name/Rick-Smith/Chapel-Hill-NC?minAge=42&maxAge=46 |
| https://www.411.com/name/{{first_name}}-{{last_name}}/{{city\|dash}}-{{state}}?minAge={{age\|add:-2}}&maxAge={{age\|add:2}} | https://www.411.com/name/Richie-Smith/Chapel-Hill-NC?minAge=42&maxAge=46 |

The user interface 1100 may display a listing representing the system generated custom URLs. The user interface may receive a user input indicating whether or not the link listed is associated with the user (e.g., receiving a selection via button "YES, THAT'S ME", or "NO, THAT'S NOT ME").

The system 100 may also generate dynamic URLs for identified individuals (e.g., FIG. 8). The user interface 1100 may display a listing representing the generated URLs. The vidually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 is configured to execute instructions 1226 for performing the operations and steps discussed herein.

The computer system 1200 may further include a network interface device 1108 to communicate over the network 1220. The computer system 1200 also may include a 2video display unit 1210 (e.g., a liquid crystal display (LCD) or a cathode ray tube (CRT)), an alphanumeric input device 1212 (e.g., a keyboard), a cursor control device 1214 (e.g., a mouse), a graphics processing unit 1222, a signal generation device 1216 (e.g., a speaker), graphics processing unit 1122, video processing unit 1228, and audio pro2cessing unit 1232.

The data storage device 1218 may include a machine-readable storage medium 1224 (also known as a computer-readable medium) on which is stored one or more sets of instructions or software 1226 embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also constituting machine-readable storage media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A system comprising one or more processors, and a non-transitory computer-readable medium including one or more sequences of instructions that, when executed by the one or more processors, cause the system to perform operations comprising:

receiving user information comprising a first name value via a first name input, a last name value via a last name input, a city value via a city input, a state value via a state input, and a year value via a year input;

determining, based on the received first name value, the received last name value, the received city value, the received state value and the received year value, a list of different websites that include information about one or more persons matching the received user first name value, the received last name value, the received city value, the received state value and the received year value;

displaying, via a user interface, the list of different multiple websites each comprising a different website link for selection by a user, wherein each different website link is generated based on a template associated with a domain name of a website and wherein the template is applied to some of the user information to generate each different website link, with each different web site link comprising a domain name concatenated with the received user first name value and the received last name value, wherein the template defines data fields and syntax of the data fields to concatenate as parameters to generate a website link, the data fields including a first name and a last name.

2. The system of claim 1, further comprising the operations of:
   displaying a listing of one or more persons associated with the at least one web site; and
   displaying an option for confirming whether a respective one or more persons associated with the at least one website is the user or is not the user.

3. The system of claim 1, further comprising the operations of:
   receiving one or more values of other names of the user via an input for other names of the user; and
   determining, based on the received one or more values of other names of the user, a list of websites that include information about a person matching the received other names of the user.

4. The system of claim 1, further comprising the operations of:
   in response to an input for a selection of a website link, directing an application to transmit a customized URL with concatenated fields to the least one website, the concatenated fields comprising at least the received user first name and the received user last name.

5. The system of claim 1, wherein the user interface includes a portion listing multiple web sites and for each listed web site the representation of a corresponding generated web site link is displayed.

6. The system of claim 1, further comprising the operations of:
   generating a set of alternative similar first names to the received first name value; and
   determining, based on the generated set of alternative first names and the received last name value, a list of websites that include information about a person matching the generated alternative similar first names and the received last name value.

7. The system of claim 1, further comprising the operations of:
   displaying custom URLs as clickable hyperlinks for each website whose matched profile confidence score exceeds a predetermined threshold value.

8. The system of claim 1, wherein the template includes a data field for a first name and a data field for a last name.

9. The system of claim 1, wherein each of the website links are generated by applying to the received user information, one or more data field macros and one or more data transformation functions to generate a concatenated text string of a respective website link.

10. The system of claim 1, wherein the template defines required data fields for concatenation as parameters for the website link.

11. A computer-implemented method, comprising the operations of:
    receiving user information comprising a first name value via a first name input, a last name value via a last name input, a city value via a city input, a state value via a state input, and a year value via a year input;
    determining, based on the received first name value, the received last name value, the received city value, the received state value and the received year value, a list of different web sites that include information about one or more persons matching the received user first name value, the received last name value, the received city value, the received state value and the received year value; and
    displaying, via a user interface, the list of different multiple websites each comprising a different website link for selection by a user, wherein each different website link is generated based on a template associated with a domain name of a website and wherein the template is applied to some of the user information to generate each different website link, with each different web site link comprising a domain name concatenated with received user first name value and the received last name value, wherein the template defines required data fields and syntax of the data fields to concatenate as parameters to generate a website link, the data fields including a first name and a last name.

12. The method of claim 11, further comprising the operations of:
    displaying a listing of one or more persons associated with the at least one web site; and
    displaying an option for confirming whether a respective one or more persons associated with the at least one website is the user or is not the user.

13. The method of claim 11, further comprising the operations of:
    receiving one or more values of other names of the user via an input for other names of the user; and
    determining, based on the received one or more values of other names of the user, a list of websites that include information about a person matching the received other names of the user.

14. The method of claim 11, further comprising the operations of:
    in response to an input for a selection of a website link, directing an application to transmit a customized URL with concatenated fields to the least one website, the concatenated fields comprising at least the received user first name and the received user last name.

15. The method of claim 11, wherein the user interface includes a portion listing multiple websites and for each listed website the representation of a corresponding generated website link is displayed.

16. The method of claim 11, further comprising the operations of:
    generating a set of alternative similar first names to the received first name value; and
    determining, based on the generated set of alternative first names and the received last name value, a list of websites that include information about a person matching the generated alternative similar first names and the received last name value.

17. The method of claim 11, further comprising the operations of:
    displaying custom URLs as clickable hyperlinks for each website whose matched profile confidence score exceeds a predetermined threshold value.

18. A computer program product comprising a non-transitory computer-readable medium having a computer-readable program code embodied therein to be executed by one or more processors, the program code including instructions to perform the operations of:

receiving user information comprising a first name value via a first name input, a last name value via a last name input, a city value via a city input, a state value via a state input, and a year value via a year input;

determining, based on the received first name value, the received last name value, the received city value, the received state value and the received year value, a list of different websites that include information about one or more persons matching the received user first name value, the received last name value, the received city value, the received state value and the received year value; and displaying, via a user interface, the list of different multiple websites each comprising a different website link for selection by a user, wherein each different website link is generated based on a template associated with a domain name of a website and wherein the template is applied to some of the user information to generate each different website link, with each different web site link comprising a domain name concatenated with the received user first name value and the received last name value, wherein the template defines required data fields and syntax of the data fields to concatenate as parameters to generate a website link, the data fields including a first name and a last name.

19. The computer program product of claim 18, further comprising the operations of:

displaying a listing of one or more persons associated with the at least one web site; and displaying an option for confirming whether a respective one or more persons associated with the at least one website is the user or is not the user.

20. The computer program product of claim 18, further comprising the operations of:

receiving one or more values of other names of the user via an input for other names of the user; and determining, based on the received one or more values of other names of the user, a list of websites that include information about a person matching the received other names of the user.

21. The computer program product of claim 18, further comprising the operations of:

in response to an input for a selection of a website link, directing an application to transmit a customized URL with concatenated fields to the least one website, the concatenated fields comprising the received user first name and the received user last name.

22. The computer program product of claim 18, wherein the user interface includes a portion listing multiple websites and for each listed website the representation of a corresponding generated website link is displayed.

23. The computer program product of claim 18, further comprising the operations of:

generating a set of alternative similar first names to the received first name value; and determining, based on the generated set of alternative first names and the received last name value, a list of websites that include information about a person matching the generated alternative similar first names and the received last name value.

24. The computer program product of claim 18, further comprising the operations of:

displaying custom URLs as clickable hyperlinks for each website whose matched profile confidence score exceeds a predetermined threshold value.

* * * * *